Nov. 10, 1925.                                                                1,560,769
A. Y. DODGE
BRAKE APPLYING CONNECTION
Filed July 16, 1925
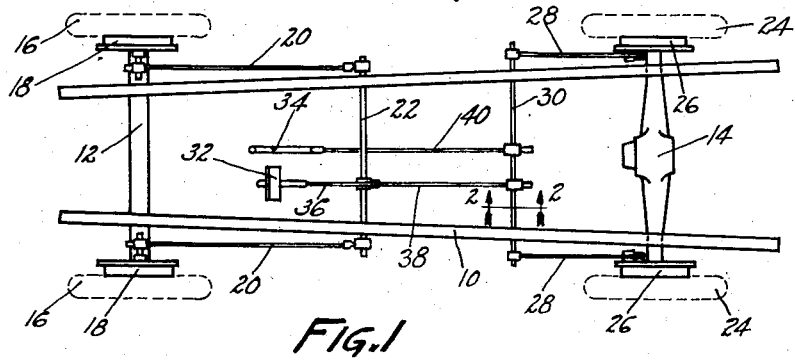
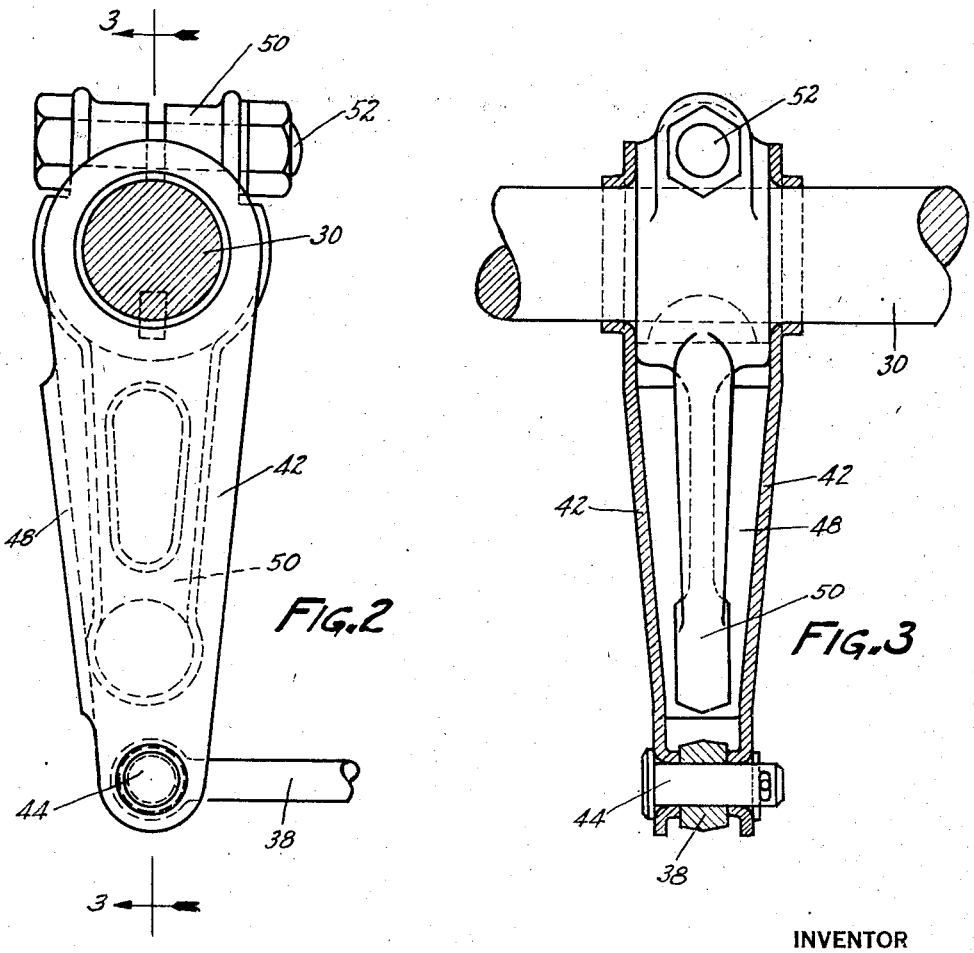
INVENTOR
ADIEL Y. DODGE
BY
ATTORNEY Patented Nov. 10, 1925.

1,560,769

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

BRAKE-APPLYING CONNECTION.

Application filed July 16, 1925. Serial No. 43,956.

*To all whom it may concern:*

Be it known that I, ADIEL Y. DODGE, a citizen of the United States, residing in South Bend, in the county of St. Joseph and State of Indiana, have invented a certain new and useful Improvement in Brake-Applying Connections, of which the following is a specification.

This invention relates to operating connections for brakes or the like, and is illustrated as embodied in an automobile chassis having brakes on all four wheels. An object of the invention is to arrange the connections so that part or all of the brakes may be applied independently by either of two operating levers, by the use of one or more novel operating members, preferably stamped in generally channel form of sheet metal, and engaging when moved in one direction a corresponding arm on a brake-applying rockshaft.

The above and other objects and features of the invention will be apparent from the following description of one illustrative embodiment shown in the accompanying drawings, in which:

Fig. 1 is a top plan view of an automobile chassis embodying the invention;

Fig. 2 is a vertical section on the line 2—2 of Fig. 1, showing the operating member in side elevation; and Fig. 3 is a vertical section on the line 3—3 of Fig. 2, showing the arm engaged by the operating member.

In the chassis illustrated in Fig. 1, the frame 10 is supported by the usual springs (not shown) carried by a front axle 12 and a rear axle 14. The front wheels 16 have brakes 18 operated by brake rods 20 from a rockshaft 22, and the rear wheels 24 have brakes 26 operated by brake rods 28 from a rockshaft 30. The brakes are applied either by a service pedal lever 32, which operates all four brakes, or by an emergency lever 34, which operates the two rear brakes only.

Pedal 32 is connected to rockshaft 22 by a brake rod 36 pivoted to an arm on the shaft, the arm and brake rod 36 also being pivotally connected to a brake rod 38 extending adjacent shaft 30. Lever 34 operates through a brake rod 40 also extending adjacent shaft 30.

Each of the brake rods or links 38 and 40 has its end arranged between the ends of the side flanges 42 of a pressed metal operating member, and pivotally connected thereto by a pin 44. At their upper ends the flanges 42 are formed with tubular projections 46 loosely sleeved on the shaft 30. The operating member is generally channel-shaped in cross section, flanges 42 being connected by a part such as the bottom web 48 which engages, when rod 38 or 40 is tensioned by its operating lever, an arm 50 housed within the channel. Arm 50 is shown as a forging keyed to shaft 30 and projecting therefrom, and it may be held by a clamp screw 52. It will be noted that the operating member 42—48, and the arm 50, form a novel and inexpensive overrunning connection especially adapted to form part of a system of brake-applying connections.

While one illustrative embodiment of the invention has been described in detail, it is not my intention to limit its scope to that particular embodiment, or otherwise than by the terms of the appended claims.

I claim:

1. A vehicle having brakes and operating connections including a rockshaft and an operating lever, and comprising, in combination therewith, an arm secured to and projecting from the rockshaft, a channel-shaped operating member having side parts pivotally mounted and arranged on opposite sides of the arm and having a part connecting the side parts and engageable with the arm to operate it, the side parts of the channel-shaped member embracing the arm between them, and a tension element connecting the operating member and the operating lever.

2. A vehicle having four-wheel brakes and operating connections including a rockshaft and two operating levers, and comprising, in combination with each operating lever, an arm secured to and projecting from the rockshaft, an operating member loosely hung on the rockshaft and having a part on the opposite side of the arm from the corresponding operating lever, and an element connecting each operating member and the corresponding operating lever.

3. A vehicle having front and rear pairs of brakes and operating connections including two rockshafts, each arranged to operate one pair of brakes, and two operating levers, the first of which is connected to one of the rockshafts, and comprising, in combination therewith, a pair of arms secured to and projecting from the other rockshaft, a pair of operating members loosely hung on said other rockshaft and having respectively parts arranged to engage said arms, a connection from one operating member to the first rockshaft, and a connection from the other operating member to the second of the operating levers.

4. A vehicle having, in combination, brakes, a rockshaft for applying the brakes, two operating levers for rocking the shaft, and an overrunning connection between each lever and the shaft including an arm secured to and projecting from the shaft, an operating member loosely hung on the shaft and having a part behind the arm, and a connection between the end of the operating member and its operating lever.

5. A vehicle having, in combination, brakes, a rockshaft for applying the brakes, an operating lever for rocking the shaft, and an overrunning connection between the lever and the shaft including an arm secured to and projecting from the shaft, an operating member loosely hung on the shaft and having a part behind the arm, and a connection between the end of the operating member and its operating lever.

6. A vehicle having, in combination, brakes, a rockshaft for applying the brakes, an operating lever, an arm secured to and projecting from the rockshaft, an operating member having parts on opposite sides of the arm loosely hung on the rockshaft and having a connecting part engageable with the arm, and a connection between the end of the operating member and the operating lever.

7. A vehicle having, in combination, brakes, a rockshaft for applying the brakes, an operating lever, an arm secured to and projecting from the rockshaft, a generally channel-shaped pressed-metal operating member having its side flanges on opposite sides of the arm and loosely hung on the rockshaft and having a connecting part engageable with the arm, and a connection between the end of the operating member and the operating lever.

8. An operating member of pressed metal, generally channel-shaped in cross-section, and having its side flanges formed to be hung on a shaft at one end of said member and formed at their opposite ends to be pivotally connected to the end of a link arranged between the flanges, and having the bottom web of the channel arranged to engage an arm arranged within the channel.

9. An over-running connection for a shaft comprising, in combination, an arm secured to the shaft, and a channel-shaped operating member having side flanges embracing and straddling the arm and pivotally mounted on opposite sides of the arm and having a cross part connecting the side flanges and engageable with the arm when the operating member is swung in one direction, together with means for so swinging the operating member.

10. An over-running connection for a shaft comprising, in combination, an arm secured to the shaft, and a channel-shaped operating member having side flanges pivotally mounted on the shaft at opposite sides of the arm and receiving the arm between them and having a cross part connecting the side flanges and engageable with the arm when the operating member is swung in one direction.

11. An over-running connection for a shaft comprising, in combination, a pair of arms, one of which is fixed on the shaft and the other of which is pressed from sheet metal in channel form to provide side flanges straddling the fixed arm and a connecting part engageable with the fixed arm in one direction of movement, the pressed metal arm being loosely pivoted by its side flanges.

12. An over-running connection comprising, in combination, a pair of arms, one of which is connected to a shaft and the other of which is pressed from sheet metal in channel form to provide side flanges straddling the fixed arm and a connecting part engageable with the fixed arm in one direction of movement, the pressed metal arm being losely pivoted by its side flanges, together with an operating member received between and pivoted to the side flanges.

In testimony whereof I have hereunto signed my name.

ADIEL Y. DODGE.